Jan. 7, 1969  C. R. LINDQUIST  3,420,210

CAKE ORNAMENTING FLOWER SPINNER

Filed March 29, 1967

Carl R. Lindquist
INVENTOR.

United States Patent Office 3,420,210
Patented Jan. 7, 1969

3,420,210
CAKE ORNAMENTING FLOWER SPINNER
Carl R. Lindquist, 1800 Stillwell Ave.,
Brooklyn, N.Y. 11223
Filed Mar. 29, 1967, Ser. No. 626,801
U.S. Cl. 118—18          8 Claims
Int. Cl. A21c 15/00

ABSTRACT OF THE DISCLOSURE

A small turntable driven at slow speed and adapted to have individual quantities of icing deposited thereon at points spaced circumferentially thereabout in a manner forming a replica of a flower on the small turntable, the latter including an upwardly convexed upper surface so as to enable the building up of the center portion of the flower to be formed thereon without excess use of icing and without causing the lower portions of the central area of the flower formed to support an excess amount of icing weight thereabove and with the center of the upwardly convexed upper surface of the small turntable including an upwardly extending projection adapted to form a supporting core for the center portion of the icing flower formed on the small turntable.

---

The cake ornamenting flower spinner assembly of the instant invention is adapted to be utilized in conjunction with and to be driven by the turntable drive shaft of the cake decorator and finishing machine disclosed in my prior U.S. Patent No. 2,503,673, dated Apr. 11, 1950.

The cake ornamenting flower spinner assembly may be considered as an integral portion of a modified form of the apparatus disclosed in my above prior patent or as a separate attachment therefor. The small turntable portions of the instant invention are adapted to have flowers of icing formed thereon as they are rotated at low speed after which the ornamental flowers of icing may be removed from the small turntable means and placed upon the cake supported on the larger turntable of the invention. Of course, the larger turntable is also driven at slow speed whereby the flowers formed may be readily placed about the upper periphery of a cake supported on the cake turntable and the flower spinner portion of the instant invention includes a plurality of small turntables or discs upon which ornamental flowers of icing may be formed, first on one spinner or small turntable and then on the other spinner or small turntable thereby allowing the icing of the first formed flower to slightly harden while the second flower is being formed prior to the first flower being positioned on the associated cake.

The main object of this invention is to provide a composite cake ornamenting machine which may be utilized to apply icing to a slowly rotating cake and also to facilitate in the formation of ornamental flowers constructed of icing and the placement of such flowers on the cake being iced.

Another object of this invention is to provide an apparatus which may be utilized to accurately spread icing upon the upper surface and side surfaces of a cake being iced.

A final object of this invention to be specifically enumerated herein is to provide an apparatus in accordance with the preceding objects which will conform to conventional forms of manufacture, be of simple construction and easy to use so as to provide a device that will be economically feasible, long lasting and relatively trouble-free in operation.

Figure 1:
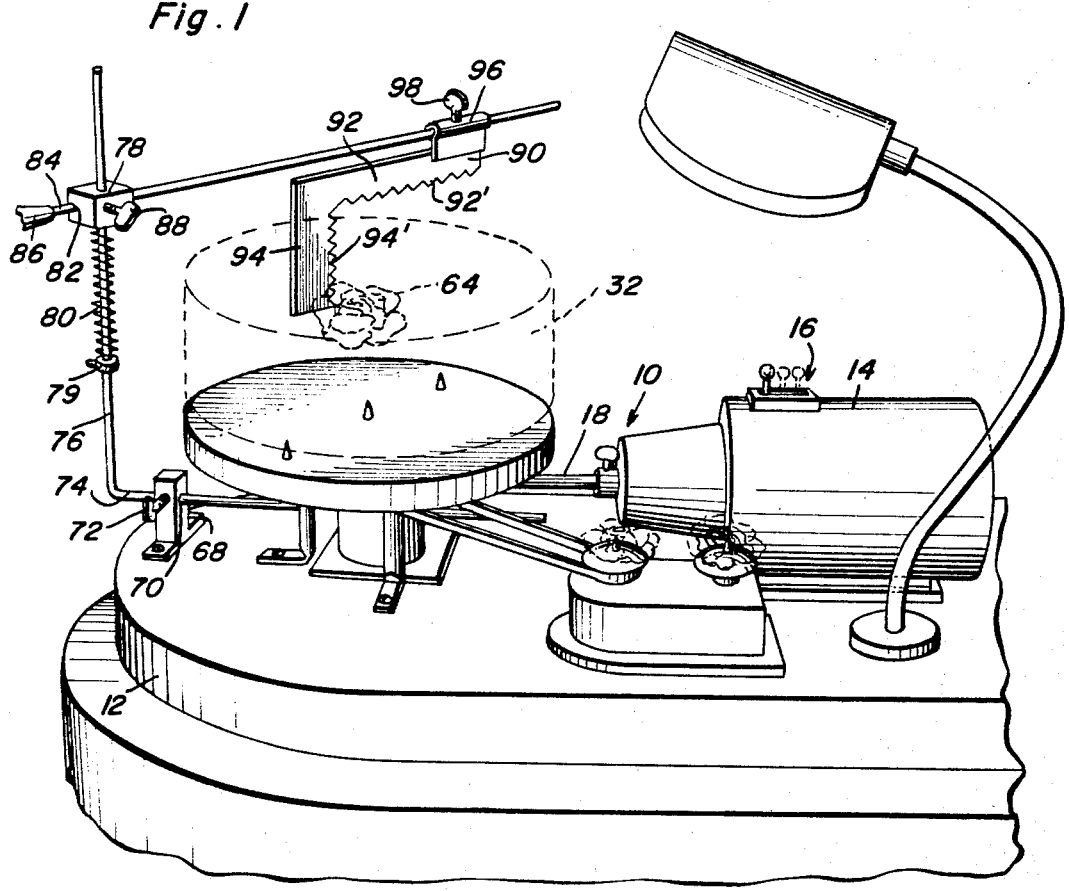
Figure 2:
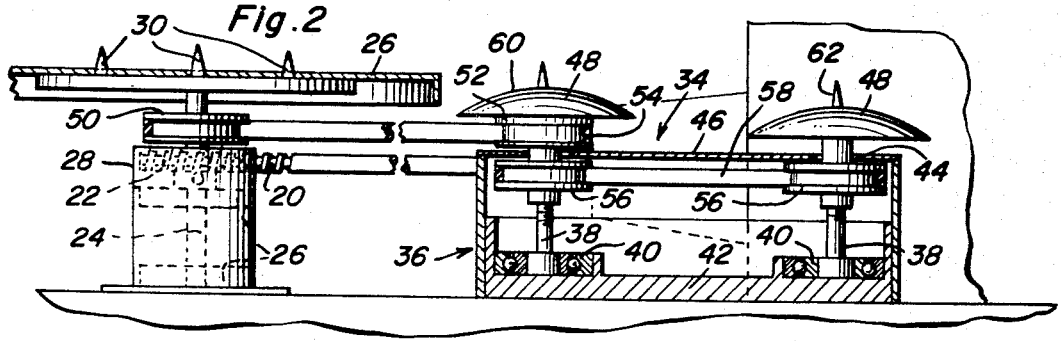

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the cake ornamenting assembly of the instant invention; and FIGURE 2 is an enlarged fragmentary vertical sectional view of the embodiment illustrated in FIGURE 1 taken substantially upon a plane passing through the center of the cake ornamenting flower spinner portion of the invention and with other portions of the apparatus broken away and illustrated in vertical section.

Referring now more specifically to the drawings the numeral 10 generally designates the assemblage of the instant invention which includes a base 12 from which a three speed electric motor 14 is supported. The motor 14 includes a suitable control switch assembly generally referred to by the reference numeral 16 for controlling the speed of operation of the motor 14 and the latter includes a rotatable output shaft 18 having worm gear teeth 20 on its outer end suitably meshed with a worm wheel 22 carried by an upstanding support shaft 24 upon whose upper end a large turntable 26 is supported. The shaft 24 is journaled by means of axially spaced bearing assemblies 26 disposed within a housing 28 supported from the base 12 in any convenient manner. The housing 28 also encloses the worm wheel 22 and the upper surface of the large turntable 26 includes upwardly projecting prongs 30 for engagement with the under portion of a cake 32 disposed on the large turntable 26. Of course, the prongs 30 are operative to retain the cake 32 in position on the turntable 26.

A cake ornamenting flower spinner assembly generally referred to by the reference numeral 34 is also supported from the base 12 and includes a housing referred to in general by the reference numeral 36 enclosing a pair of support shafts 38 journaled at their lower ends by means of suitable bearings 40 supported from the bottom 42 of the housing 36. The upper ends of the shafts 38 project through suitable openings 44 provided therefor in the top wall 46 of the housing 36 and a pair of discs 48 are supported from the upper ends of the shafts 38 for rotation therewith. In addition, the shaft 24 and one of the shafts 38 include aligned pulleys 50 and 52 and an endless flexible belt 54 is entrained about the pulleys 50 and 52 and thereby drivingly connects the shaft 24 to the shaft 38 upon which the pulley 52 is mounted. In addition, the shafts 38 include aligned pulleys 56 disposed within the housing 36 and an endless flexible belt 58 is entrained about the pulleys 56.

Each of the discs 48 includes an upwardly convexed upper surface 60 from whose center portion an upward projection 62 extends and it is to be noted that suitable flowers may be formed on the slowly rotating discs 48 by a skilled person depositing individual quantities of icing thereon at points spaced circumferentially thereabout. Flowers such as the rose 64 illustrated in phantom lines in FIGURE 1 of the drawings may be readily formed by a skilled person and after a rose 64 is formed on one spinner or disc 48, a second rose 64 is formed on the other disc 48. Then, the first formed rose 64 may be removed from its supporting disc 48 and placed on the cake 32 as the latter is slowly rotated. Then, the third rose 64 may be formed on the vacated disc 48 prior to the second formed rose 64 being removed from its supporting disc. In this manner, the icing of which each rose 64 is constructed may slightly harden before the rose 64 is removed from its supporting disc 48.

The assembly 10 also includes an upstanding base 68 secured to the base 12 adjacent the large turntable 26 and through which a horizontal bore 70 is formed, the bore 70 having a thumb-type setscrew 72 operatively associated therewith. A supporting structure including a horizontal rod 74 is slidably disposed through the bore 70 and may be retained in adjusted positions by means of the setscrew 72. One end of the rod 74 supports the lower end of an upstanding rod 76 and a support block 78 is vertically slidable on the upstanding rod 76 above a vertically adjustable abutment collar 79 carried on the rod 76. An expansion spring 80 is disposed between the confronting surfaces of the block 78 and the collar 79 and thereby yieldingly urges the support block 78 upwardly from the collar 79. Further, the support block 78 has a horizontally disposed bore 82 formed therethrough through which a horizontally disposed support arm 84 having a handle 86 is lonigtudinally slidably received. The block 78 includes a thumb-type setscrew 88 operatively associated with the bore 82 whereby the arm 84 may be retained in adjusted longitudinally shifted positions and an L-shaped smoothing comb 90 including a horizontal leg portion 92 and a vertical leg portion 94 is supported from the end of the arm 84 remote from the handle 86 by means of a sleeve 96 rotatably and slidably mounted on the arm 84 and supported from the free end of the leg portion 92. The sleeve 96 includes a thumb-type setscrew 98 of conventional design whereby the longitudinal and angular displacement of the sleeve 96 relative to the arm 84 may be retained as desired.

In operation, the icing to be applied to the cake 32 may be placed upon the upper surface of the cake 32 as well as the side surfaces thereof in a reasonably random manner. Then, the comb 90 may be adjusted so that the adjacent sawtooth edges 92' and 94' of the comb 90 will engage the icing on the side surfaces and top surfaces of the cake 32. In this manner, the icing to be applied to the cake 32 may be applied thereto in a manner compensating for any slight irregularities in the cake 32. Of course, after the sawtooth edge portions 92' and 94' are used, a suitable implement may be utilized to smooth the icing on the top and side surfaces of the cake 32 so as to remove any ridges formed therein by the sawtooth edges 92' and 94'. Then, the ornamental flowers to be applied to the cake 32 such as roses 64 may be formed on the discs 48 in the manner hereinbefore set forth.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A cake ornamenting flower spinner assembly including an upstanding journaled shaft, a generally horizontally disposed radially outwardly projecting support disc carried by the upper end of said shaft for rotation therewith and adapted to have individual quantities of icing deposited thereon at points spaced circumferentially thereabout in a manner forming a replica of a flower on said support disc with said quantities of icing, drive means drivingly connected to said shaft for rotation of said shaft at slow speed, the upper surface of said disc being slightly upwardly convexed so as to enable the building up of the center portion of said flower without excess use of icing and without causing the lower portions of the central area of the flower formed to support an excess amount of icing weight thereabove, the central portion of said disc including an upwardly extending projection adapted to be contained in and to form a supporting core for the center portion of the icing flower formed on said disc until the icing has been exposed to the air a short length of time sufficient to at least slightly stiffen the icing.

2. A cake ornamenting flower spinner assembly including an upstanding journaled shaft, a generally horizontally disposed radially outwardly projecting support disc carried by the upper end of said shaft for rotation therewith and adapted to have individual quantities of icing deposited thereon at points spaced circumferentially thereabout in a manner forming a replica of a flower on said support disc with said quantities of icing, drive means drivingly connected to said shaft for rotation of said shaft at slow speed, said drive means including a generally horizontal turntable rotatable about an upstanding axis and adapted to support a cake to be iced, motor means drivingly connected to said turntable, and drive connection means drivingly connecting said turntable to said shaft.

3. The combination of claim 2 wherein said assembly includes a base from which said shaft and turntable are rotatably supported, said base including an upright standard disposed alongside said turntable, a slide member slidably mounted on said upright standard, a horizontal arm supported from said slide member, and an inverted L-shaped blade member carried by the end portion of said arm remote from said standard shiftable along the longitudinal axis of said arm relative to said standard and including a horizontal leg generally paralleling said arm and a vertical leg depending from the end of said horizontal leg adjacent said upright standard, said blade being adapted to overlie said turntable and to smooth the icing applied to the upper and side surfaces of a cake on said turntable.

4. The combination of claim 3 wherein said blade is supported from said arm for adjustment longitudinally therealong.

5. The combination of claim 4 wherein said blade is supported from said arm for angular displacement about the longitudinal center axis of said arm.

6. The combination of claim 3 wherein said upright standard includes means yieldingly urging said slide member toward an upper position on said upright standard.

7. The combination of claim 6 wherein the last-mentioned means includes means operative to simultaneously and equally vertically adjust said upper position and adjustably define a downward limit of movement of said slide member below said upper position.

8. A cake decorating assembly comprising a base, a driven turntable journaled from said base, said base including an upright standard disposed alongside said turntable, a slide member slidably mounted on said upright standard, a horizontal arm supported from said slide member, and an inverted L-shaped blade member carried by the end portion of said arm remote from said standard shiftable along the longitudinal axis of said arm relative to said standard and including a horizontal leg generally paralleling said arm and a vertical leg depending from the end of said horizontal leg adjacent said upright standard, said blade being adapted to overlie said turntable and to smooth the icing applied to the upper and side surfaces of a cake on said turntable, said upright standard including means yieldingly urging said slide member toward an upper position on said upright standard.

References Cited

UNITED STATES PATENTS

| 851,558 | 4/1907 | Polk | 25—24 |
| 1,472,022 | 10/1923 | Cockbill et al. | 118—18 |
| 1,796,102 | 3/1931 | Hoffmann | 107—15 |
| 2,708,899 | 5/1955 | Rudolph | 118—500 |
| 2,734,246 | 2/1956 | Sayre | 25—24 |

FOREIGN PATENTS

| 834,111 | 5/1960 | Great Britain. |

WALTER A. SCHEEL, *Primary Examiner.*

JOHN P. McINTOSH, *Assistant Examiner.*

U.S. Cl. X.R.

118—23, 500